United States Patent [19]
Bhattacharyya et al.

[11] Patent Number: 4,881,143
[45] Date of Patent: Nov. 14, 1989

[54] COMPENSATED MAGNETO-RESISTIVE READ HEAD

[75] Inventors: Manoj K. Bhattacharyya, Cupertino, Calif.; Robert J. Davidson, Eagle, Id.; Hardayal S. Gill, Los Altos, Calif.

[73] Assignee: Hewlett-Packard Company, Palo Alto, Calif.

[21] Appl. No.: 145,784

[22] Filed: Jan. 19, 1988

[51] Int. Cl.⁴ .............................................. G11B 5/12
[52] U.S. Cl. ................................... 360/113; 360/125
[58] Field of Search ....................... 360/113, 122, 125

[56] References Cited

U.S. PATENT DOCUMENTS

| | | | |
|---|---|---|---|
| 3,887,945 | 6/1975 | Nepela et al. | 360/113 |
| 3,945,038 | 3/1976 | Lazzari | 360/113 |
| 4,547,824 | 10/1985 | Best et al. | 360/113 |
| 4,639,811 | 1/1987 | Diepers et al. | 360/125 |
| 4,698,711 | 10/1987 | Vinal | 360/113 |

Primary Examiner—John H. Wolff
Attorney, Agent, or Firm—William H. F. Howard

[57] ABSTRACT

A read/write head for a hard disk provides both a magneto-resistive read function and an inductive write function in a common gap. The inductive write function is provided by a current carrying coil which is magnetically coupled to top and bottom shields or pole tips which in turn induce the magnetic fields required for writing on the disk. Mutually biasing magneto-resistive read sensor are located between the shields, which serve to improve the resolution of the read function. During a read operation, read/write circuitry maintains a current in the coil which cancels, at least partially, magnetic fields induced by sensing and bias currents in the magneto-resistive heads which might other perturb information stored in the medium. This arrangement provides a read/write head with improved read/write resolution as required by emerging high density storage media in compact formats.

9 Claims, 3 Drawing Sheets

COMPENSATED MAGNETO-RESISTIVE READ HEAD

BACKGROUND OF THE INVENTION

This invention relates to a novel read head assembly employable, for example, in a hard disk magnetic storage system. A major objective of the present invention is to integrate a magneto-resistive read head with an inductive write head so as to provide improved resolution for reading high density recordings.

Magnetic transducer heads are widely used for reading from and writing to magnetic storage media such as fixed disks, removable floppy and rigid disks, and magnetic recording tape. Inductive heads have been widely employed to perform both read and write functions. Reading with an inductive element involves converting flux changes in the media into electrical signals which are output from the read/write head.

The strength of the read output signal from an inductive head is proportional to track width, bit length and media velocity relative to the head. Progress with magnetic media has affected each of the parameters in a manner adverse to the output strength from an inductive head. The development of magnetic media with higher coercivity has permitted greater storage densities. To take advantage of this increased storage capacity, track widths and bit lengths are diminished. In addition, disk-shaped storage media have become more compact, with popular form factors evolving from 14" to 8" to 5.25", and recently to 3.5" iameters. The smaller diameters have generally resulted in decreased linear velocity of the media relative to the head. This trend has reached a point where the flux available in the media can be insufficient to provide a reliable read output from an inductive head.

Inductive read heads are considered passive in the sense that they rely primarily on flux transitions in the media as the source of energy for the read output signal. Active read heads, in contrast, use the flux transitions to modulate a current or other signal carrier. Thus, signal output is not directly limited by flux strength. The stronger output available is easier to detect and less vulnerable to noise.

Magneto-resistive read heads, one class of active read heads, provide roughly an order of magnitude improvement in signal output when compared with inductive read heads. This makes them better suited for the narrow track widths and short bit lengths of dense storage media. In addition, magneto-resistive read heads are sensitive to flux level rather than to flux change rate, to which inductive read heads respond. Therefore, magneto-resistive heads are better suited for reading when the lower linear velocities of modern compact media are used. In short, magneto-resistive heads are superior to inductive read heads in reading information densely stored on compact, high-coercivity media.

The write function has not been subject to a parallel development. Working in the opposite direction relative to the read function, the write function converts electrical signals from a host system into flux transition in the media. Electrical signal strength has not proved to be a limiting factor in inductive writing.

On the other hand, magneto-resistive write heads have not proved practicable. The basic principle of a magneto-resistive head is that flux changes are converted to changes in resistance in a magneto-resistive sensor. This resistance is detected as a voltage change in an electrical path containing the magneto-resistive sensor as current flows through the path. For this conductor to generate the magnetic fields required for writing, it would have to be too thick to provide the sensitivity required by the magneto-resistive effect during reading. Hence, inductive heads are preferred for writing while magneto-resistive heads are preferred for reading compact high-density media.

Typically, a magneto-resistive sensor is a strip of magneto-resistive material which has a preferred alignment for a magnetic moment referred to as an "easy axis". The axis in the plane of the sensor orthogonal to the easy axis is the "hard axis". For the read head to respond linearly to flux levels in an adjacent medium, the current through the magneto-resistive sensor must be oblique to its magnetic moment. However, the easy axis of a magneto-resistive sensor tends to lie along its length, which defines a favored direction for current flow. Since the easy axis is a favored direction for both the current and the magnetic moment, transverse biasing is used to provide a linear operating region about the zero media field condition.

Four schemes for applying such a transverse bias are disclosed in "Magnetics of Small Magnetoresistive Sensors" by Ching Tsang, J. Appl. Phys. 55 (6), Mar. 15, 1984, pp. 2226–2231. The first scheme is shunt biasing in which current is passed through a conductor sensor adjacent to the magneto-resistive sensor; the magnetic effect of this current biases the magneto-resistive head. In a second scheme, soft-film biasing, a soft magnetic film is placed adjacent to the magneto-resistive sensor; the bias current through the magneto-resistive sensor magnetizes the soft film, which in turn applies a magnetic field to bias the magneto-resistive sensor. Hard film biasing has also been considered in which a permanently magnetized sensor is placed adjacent to the magneto-resistive sensor; the operative principle is then comparable to the soft-film scheme. While in the foregoing scheme the magnetic moment is rotated relative to the easy axis, in a canted current or "barber pole" biasing scheme, slanted conductor sensors force current to flow obliquely to the easy axis.

In a fifth "mutual" bias scheme, disclosed in U.S. Pat. No. 3,860,965 to Voegeli, two magneto-resistive sensors are magneto-statically coupled to bias each other. In particular, the current in one sensor generates the field used to bias the other, and vice versa, in a manner related to the shunt biasing approach. Thus, the current through each magneto-resistive sensor serves as both a sense current and a bias current. An output differential read signal is obtained from the two magneto-resistive sensors. This has the advantage of doubling the signal output while rejecting common mode noise.

One approach to providing an integrated inductive write and magneto-resistive read head includes distinct, adjacent read and write gaps. This approach is disclosed in "An integrated Magnetoresistive Read, Inductive Write High Sensitivity Recording Head" by C. H. Bajorek, S. Krongelb, L. T. Romankiw and D. A. Thompson, Magnetism and Magnetic Materials—1974, American Institute of Physics Conference Proceedings, No. 24, Ed. C. D. Graham, Jr. G. H. Lander and J. J. Rhyne. This integrated head consists of one turn vertical shielded magneto-resistive head directly on top of an inductive head. A center magnetic layer serves both as a shield for the magneto-resistive head and as a pole tip for the inductive head. The magneto-resistive head uses a permanent magnet biasing scheme. The sharing of this center magnetic layer provides a manufacturing advantage in that fewer lithographic processing steps are needed than are required for separate heads.

Further processing advantages can be obtained by positioning the magneto-resistive sensor between the pole tips of an inductive head so that both pole tips serve as shields for the read head. This obviates the need for separate shields for the magneto-resistive sensor. This approach is disclosed by J. C. v. Lier, G. J. Koel, W. J. v. Gestel, L. Postman, J. T. Gerkema, F. W. Gorter and W. F. Druyvesteyn in "Combined Thin Film Magnetoresistive Read, Inductive Write Head", IEEE Transactions on Magnetics, Vol. MAG-12, No. 6, November 1976, pp. 716-718. Lier et al. disclosed a barber pole bias scheme for the read head which was situated in an inductive write head.

The Bajorek et al. and Lier et al. references represent advances in integrating inductive writing and magneto-resistive reading. The advantages of integration include reduction of processing steps and other manufacturing and operation savings. However, each technological advance, while achieving certain objectives, introduces new obstacles which must be identified and overcome. The present invention is based on the discovery of an important source of performance limitations in integrated inductive write and magneto-resistive read heads, which limitations are then overcome.

SUMMARY OF THE INVENTION

The present invention is motivated by the discovery that the read operation of a magneto-resistive head can significantly disturb the data stored on the medium being read. To the extent that the possibility of such a disturbance is discernable in the prior art, it has been dismissed as being insignificant in practice. When passive inductive read heads are used, there is minimal disturbance of the media. However, the current of an active read head generates a magnetic field which is amplified by the shields used to obtain high resolution reading. Generally, the larger the current is in the magneto-resistive head, the larger the field. In a dual-sensor magneto-resistive head, the fields induced in the shield by each sensor add. The resulting combined field can perturb magnetic transitions in a mangetic medium. In other words, magnetic domains in the medium can be altered or moved, resulting in the loss of valid information.

The present invention minimizes read operation perturbation of the medium by at least partially cancelling the magnetic field induced by the sense current. Since the major perturbation is due to the field as amplified by the shield, the cancellation is preferably effected at the shield by a second magnetic field of opposite polarity. In an integrated read/write head, the opposing magnetic field can be generated conveniently by passing a current through the same coils used in write operations. This configuration allows sufficient current to be used for the active read operation while avoiding strong fields at the media which might result in the loss of valid information. In addition, this configuration saves processing steps and yields a more compact read/write head.

To prevent the magnetic field in the shield from disturbing the read function of the magneto-resistive head, it is preferable that each magneto-resistive sensor be substantially perpendicular to the magnetic field from the shield. This can be accomplished by having the inner surfaces of the shield extend parallel to the magneto-resistive sensors for the full height of the sensor. The parallelism of the shield near the magneto-resistive sensors minimizes the formation of separate domains therein, which in turn minimizes noise in the read operation. A dual-sensor head can be accommodated despite the high total currents. The fields generated by these currents are cancelled at the shield and thus do not perturb the magnetic medium. Other features and advantages of the present invention are apparent from the description below with reference to the following drawings.

DESCRIPTION OF THE PREFERRED EMBODIMENTS

Figure 1:
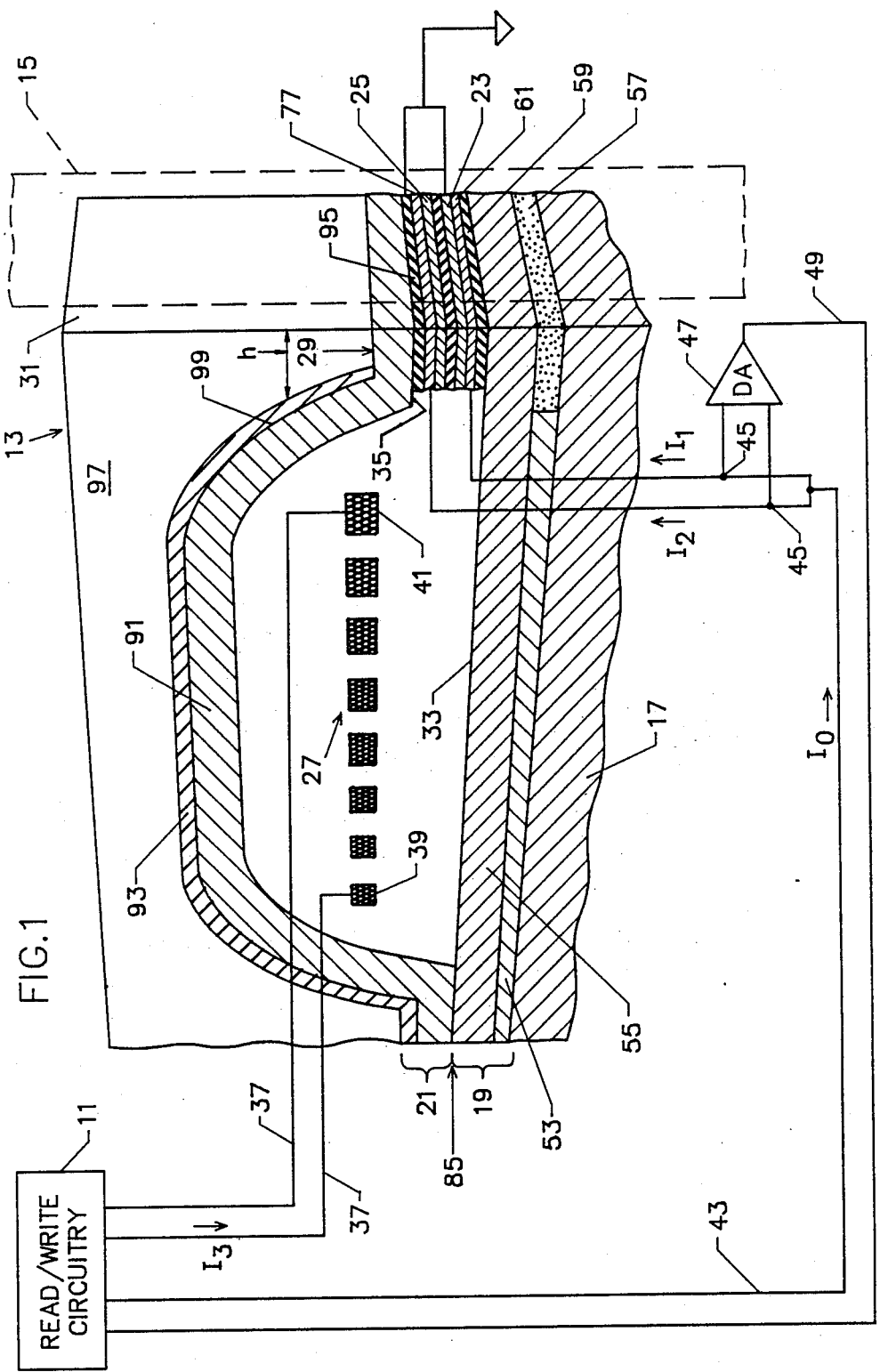
FIG. 1 is a schematic perspective and sectional view of an integrated inductive write and magneto-resistive read head in accordance with the present invention.

A magnetic storage and retrieval system includes read/write circuity 11, a read/write head 13 and a magnetic recording medium 15, as shown in FIG. 1. Recording medium 15 is a track of a fixed disc. On the scale of FIG. 1., the track can be considered a linear strip of magnetic recording medium which moves downward relative to head 13.

Figures 2, 3:
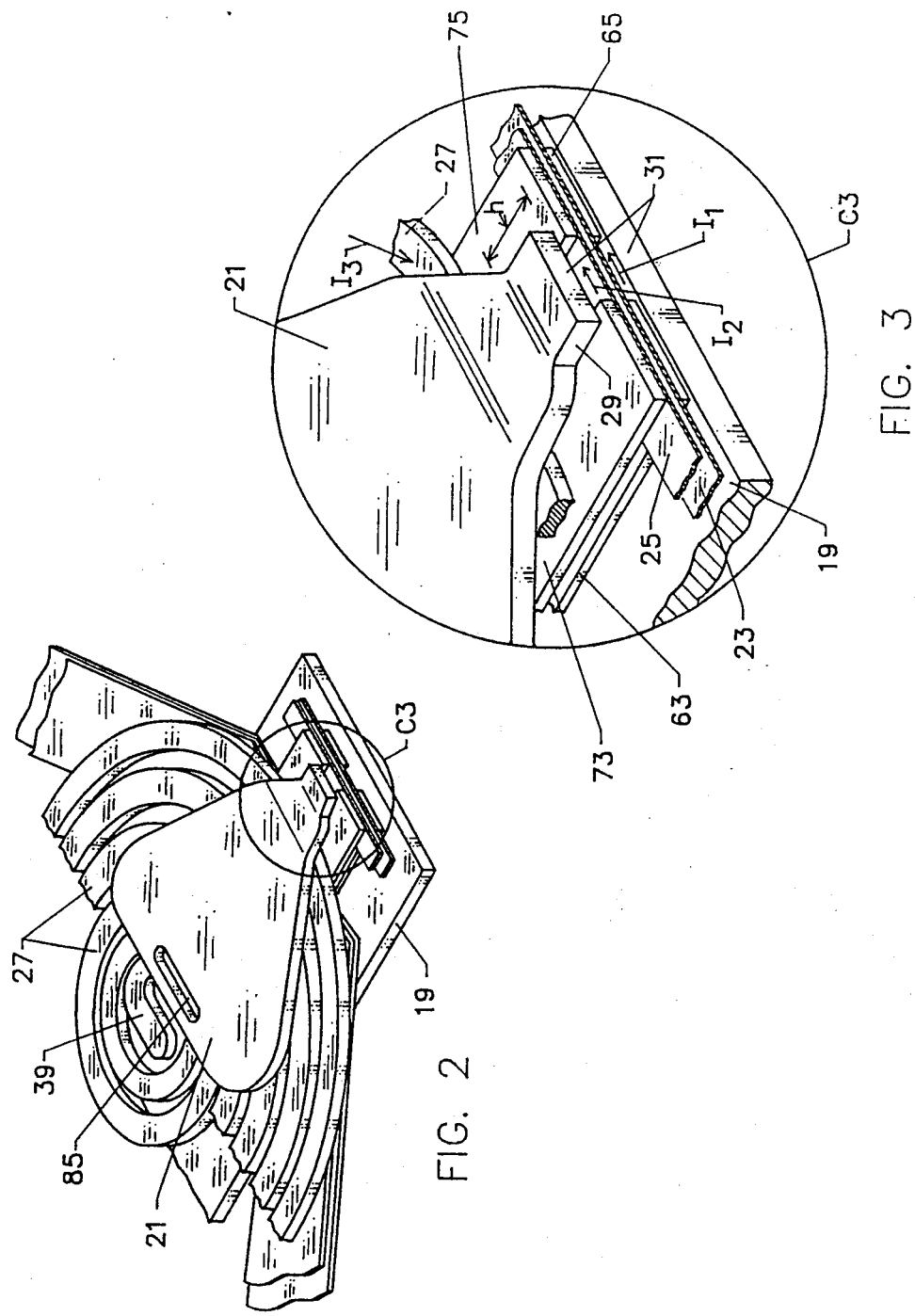
FIG. 2 is a perspective view of the read/write head of FIG. 1.
FIG. 3 is an enlarged perspective view of the portion of FIG. 2 enclosed in circle C3.

Head 13 includes a substrate 17 upon which its operational elements are fabricated. A bottom shield 19 and a top shield 21 serve both as shields during read operations and as pole tip pieces during inductive write operations. A bottom magneto-resistive sensor 23 and a top magneto-resistive sensor 25 are used during read operations in a mutual bias configuration. An inductive coil 27, the structure of which is best shown in FIG. 2, is used to magnetize shields 19 and 21 during write operations. In accordance with the present invention, coil 27 is also used during read operations to cancel magnetic fields induced in shields 19 and 21 by current through magneto-resistive sensors 23 and 25

Top shield 21 includes a neck 29 which extends a height h from an air-bearing surface 31 adjacent to medium 15 at least about as far as magneto-resistive sensors 23 and 25 extend, as best shown in FIG. 3. This ensures that the magnetic fields at magneto-resistive sensors 23 and 25 induced by the cancellation fields in shields 19 and 21 are orthogonal to the magneto-resistive sensors 23 and 25 so that the read operation is not disturbed. With reference to FIG. 1, another way of stating this requirement is that the inner surfaces 33 and 35 of shields 19 and 21 should be parallel to the magneto-resistive sensors 23 and 25 for at least the extent of the latter. Parallelism of inner surface 35 requires precise dimensioning of neck 29.

During a write operation, read/write circuitry 11 controls the current through coil 27 via lines 37 coupled to the centermost turn 39 and the outermost turn 41 of coil 27, as shown in FIG. 1. The current through coil 27 induces magnetic fields in shields 19 and 21, which serve as pole tip pieces. These fields polarize a magnetic domain situated adjacent to the trailing pole tip of shield 21 and within magnetic medium 15, as is known in the art. The fields generated by magneto-resistive sensors 23 and 25 themselves are on the order of 2-3 Oersteds (Oe). The magneticc field generated by the amplifying effect of shields 19 and 21 can be on the order of 400 Oe. This can suffice to disturb magnetic domains in a medium with a coercivity of 1000 Oe, although a field of 2000 Oe is required to write reliably on such a medium.

During a read operation, read/write circuitry 11 supplies, via line 43, a constant sensor and bias current $I_0$ which is split between the two magneto-resistive sensors 23 and 25 into currents $I_1$ and $I_2$, as shown in FIG. 1. As shown in FIG. 3, current $I_1$ is carried to bottom magneto-resistive sensor 23 by a first bottom conductor 63 and carried from magneto-resistive sensor 23 by a second bottom conductor 65. A 4 micron ($\mu m$) gap between first bottom conductor 63 and second bottom conductor 65 defines the portion of magneto-resistive sensor 23 through which current $I_1$ flows. Likewise, current $I_2$ flows successively through a first top conductor 73, a 4 $\mu m$ portion of top magneto-resistive sensor 25, and a second top conductor 75.

The read track width, here 4 $\mu m$, defined by the separation of the two bottom conductors 63 and 64, as well as the separation of the two top conductors 73 and 75, determines the read resolution of head 13. The width of neck 29 at air-bearing surface 31 perpendicular to the direction of movement of medium 15 should be greater than the read track width to ensure proper shielding. The neck width of head 13, here 6 $\mu m$, defines the write resolution of head 13.

The voltage drop caused by the current through the 4 $\mu m$ portions of magneto-resistive sensors 23 and 25 controls the voltages at nodes 45, FIG. 1. As the resistance of each magneto-resistive sensor 23, 25 is affected by adjacent magnetic fields in the passing medium 15, voltages at nodes 45 are modulated. Magneto-resistive sensors 23 and 25 are biased in opposite directions, so that the modulations are complementary. A differential amplifier 47 effectively sums the modulations and transmits them along line 49 to be detected by read/write circuitry 11 and decoded.

Currents $I_1$ and $I_2$ through magneto-resistive sensors 23 and 25 induce fields in shields 19 and 21, which can in turn perturb medium 15 during a read operation. Accordingly, read/write circuitry 11 sends a constant current $I_3$ through coil 27 to generate a field which offsets or cancels the field induced by currents $I_1$ and $I_2$. The geometry of shields 19 and 21 near air-bearing surface 31 confines the field induced by coil 27 to an orientation perpendicular to magneto-resistive sensors 23 and 25 so the latter are not significantly affected by the cancellation process.

The sensor and bias current $I_1$, $I_2$ through each magneto-resistive sensor 23, 25 is about 20 mA. This is sufficient to generate the magnetic field corresponding to a 40 mA total current. Different currents could be used for different required field strengths, bias schemes and gap sizes. With the given current, an inductor current of about 6 mA in the illustrated nine-turn inductor coil 27 is sufficient to cancel the magnetic field induced by sense/bias currents $I_1$ and $I_2$ in shields 19 and 21.

Read/write head 13 can be fabricated as one of several on a wafer substrate using thin film techniques as described below primarily with reference to FIG. 4. For example, the wafer can consist of a 160 mil thick substrate 17 of aluminum oxide and titanium carbide mixture ($Al_2O_3$/TiC) with a 10 micron ($\mu m$) thick smoothing layer of aluminum oxide. The smoothing layer provides a foundation for subsequent thin film processing steps which is smoother than that which is provided by a bare $Al_2O_3$/TiC surface.

Bottom shield 19, which serves as both a pole tip for the inductive write function and as a shield for the magneto-resistive read function, is fabricated in two layers 53 and 55. The upper layer 55 extends to air bearing surface, while the lower layer 53 does not. This arrangement yields a relatively thin structure adjacent to medium 15, FIG. 1, for sharper writing transitions and a relatively thick structure for the body of shield 19 providing for a stronger magnetic field. This two layer configuration thus provides for both high flux strengths and high resolution in the writing process.

Preferably, the shield material has a high saturation magnetism $M_s$ to facilitate amplification of the magnetic field generated by inductive coil 27. Lower shield layer 53 can be sputter deposited on substrate 17. This disposition is ion milled and/or etched to the desired shape so that it is set back from air bearing surface 31. The areas from which the alloy has been etched are filled with a dielectric material such as $Al_2O_3$, e.g., at 57, to provide a flat top surface for subsequent processing steps. The upper layer of bottom shield 19 can be deposited, shaped and planarized using similar procedures. Lower layer 53 is about 1.5 $\mu m$ thick and upper layer 55 is about 2 $\mu m$ thick.

Figure 4:
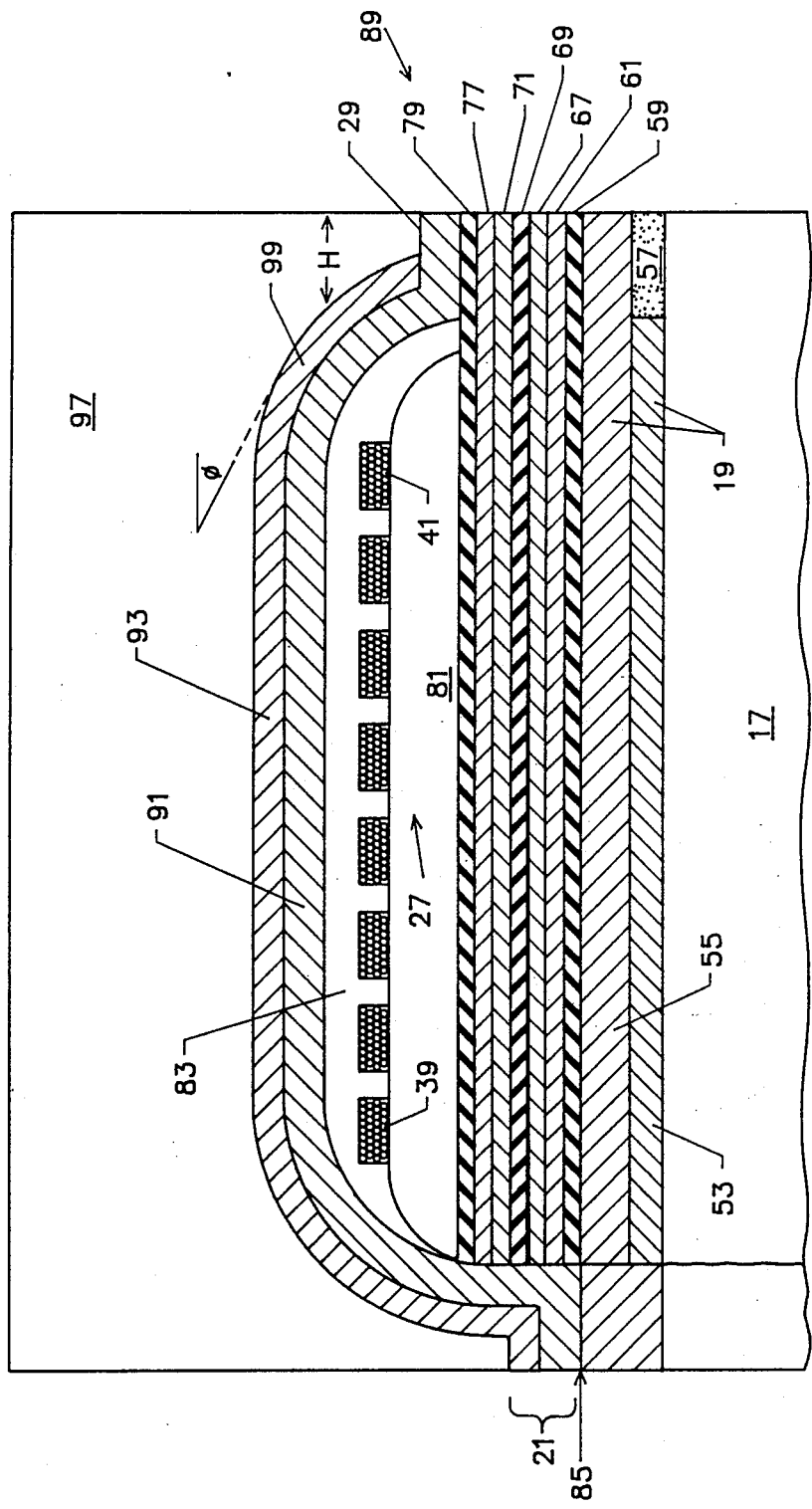
FIG. 4 is a schematic side view illustrating the steps used to form the head of FIG. 1.

Still referring to FIG. 4, a bottom isolation dielectric 59 of $Al_2O_3$ is sputter deposited on upper layer 55. Dielectric 59, which can be about 50 nanometers (nm) thick, provides electrical insulation between bottom shield 19 and a bottom conductor layer 61. Alternatively, polyimide can be used as the isolation dielectric material.

Bottom conductor layer 61 includes bottom conductors 63 and 65, shown in FIG. 3, which carry current to and from bottom magneto-resistive sensor 23. Bottom conductor layer 61 can be sputter deposited as a 130 nm thick metal film. Bottom conductors 63 and 65 can be patterned using either direct chemical etching or a lift-off technique. Bottom conductor layer 61 is then planarized.

Bottom magneto-resistive sensor 23 can be formed in a bottom magneto-resistive film 67 which can be of a nickel-iron-cobalt alloy. The alloy is selected for its high magnetic anisotropy and controllable magneto-restriction. This film 67 is about 40 nm thick to provide a sufficient change in resistivity, e.g., $\Delta R/R \approx 3\%$, for the output to be readable. Bottom magneto-resistive sensor 23 can be patterned using a wet chemical etch. The resulting sensor 23 is about 3 $\mu m$ high and 250 $\mu m$ long.

An inter-sensor dielectric 69 of $Al_2O_3$ is sputter deposited over bottom magneto-resistive sensor 23. Alternatively, a layer of polyimide can be spun onto a bottom magneto-resistive film to form a planar insulating layer between two magneto-resistive sensors. Top magneto-resistive sensor 25 is formed in top magneto-resistive film 71 using the same specifications and procedures applied to form bottom magneto-resistive sensor 23. Top conductors 73 and 75, shown in FIG. 3, are formed in a top conductive layer 77, shown in FIG. 4, using the procedures, including planarization, and specifications used in forming bottom magneto-resistive conductors 63 and 65.

Over top conductive layer 77, a thin top isolation dielectric 79 of $Al_2O_3$ is sputter deposited. This dielectric is patterned using photolithography. Vias for a shunt 85, for each conductor 63, 65, 73 and 75, a center coil contact 39 and a outer coil contact (not shown) are chemically etched in this layer. A bottom coil dielectric 81 of polyimide or, alternatively, polyamide-imide is spun on to a thickness of 1.5 to 2.0 times the thickness of coil 27. Bottom coil dielectric 81 is then reactive ion etched to a depth equal to the thickness of coil 27 to define its bed.

Aluminum is evaporated in a collimated deposition process to define coil 27. A top coil dielectric 82 is spun on using the same material employed as bottom coil dielectric 81 to planarize and encapsulate coil 27. Top coil dielectric 83 has a thickness approximately equal to that of coil 27.

A shunt-gap etch is applied to clear coil encapsulation material from the shunt 85, electrical contact pad region 87, electrical contact vias for sensor and coil conductors and the gap region 89, shown in FIG. 2. Because top shield 21 follows the topography from the top surface of top coil dielectric 83 to gap region 89, it is important to control the apex angle $\phi$ of the edge of top coil dielectric 83, indicated in FIG. 4. In the illustrated embodiment angle $\phi$ is about 45°.

As shown in FIG. 1, top shield 21 comprises upper and lower layers 91 and 93 to combine high-field strength and high writing resolution. The top isolation dielectric 79 serves as an etch-protect layer to protect the dielectric in gap region 89 during the etching of the bottom resist layer. Among the variants of this process are the use of polyimide at roughly the same thickness as top shield 21 to perform a process similar to that for the coil or the use of a thick bottom resist. In either case, it is necessary to reactive ion etch or otherwise patatern etch protect layer 95 prior to the deposition of lower top shield layer 91. Alternatively, ion milling can be used to define top shield 21. Industry-standard pad plating and passivation 97 are used in completing head 13.

In forming top shield 21, neck 29 and a sloping portion 99 are designed to minimize fields that might disturb the domain structure of the magneto-resistive sensors 23 and 25 while allowing sufficient field strength at medium 15 for write operations. Neck 29 preferably extends at least as high as the magneto-resistive sensors 23 and 25, i.e., $h > 3$ $\mu$m. In practice, neck 29 can be 3 $\mu$m $< h < 5$ $\mu$m to accommodate manufacturing tolerances.

Although the present invention is described above in the context of a read/write head, other embodiments provide a read function without writing capability. The means for cancelling magnetic fields at the shields need not be an inductive coil, and where an inductive coil is used in the cancelling means, the coil need not also be used to generate a field for writing. Alternative bias schemes can be used for the read sensor, and different materials and processes can be used in fabricating a head incorporating the present invention. The medium can be disk or tape based. A wide range of coercivities for the magnetic layers can be used. Perpendicular as well as longitudinal dipole orientations in the medium are provided for. Currents and field strengths can be varied as appropriate for a given head and medium. These and other modifications to and variations on the described embodiments are provided for by the present invention, the scope of which is limited only by the following claims.

What is claimed is:

1. A device comprising:
   read means for modulating a voltage drop imposed on an electrical read current to provide a signal as a function of flux levels stored in a magnetic medium moving relative to said read means, said read means including input means for receiving said read current, said read means including output means for transmitting said signal;
   shield means for isolating said read means from magnetic fields from sources other than a portion of said magnetic medium at a predetermined location relative to said read means, said shield means being positioned with respect to said read means so that said read current induces a magnetic field in said shield means; and
   cancellation means for substantially cancelling said magnetic field in said shield means.

2. The device of claim 1 wherein said read means includes a magneto-resistive sensor.

3. The device of claim 1 wherein said read means includes a pair of mutually biasing magneto-resistive sensors.

4. The device of claim 1 wherein said cancellation means includes a coil inductively coupled to said shield means.

5. The device of claim 1 further comprising write means including said cancellation means, said write means including a coil inductively coupled to said shield means, said write means including means for writing on said media by driving current through said coil, said cancellation means including means for driving an offset current through said coil so as to create a magnetic offset field in said shield means which substantially offsets said field in said shield means induced by said read means while said read current is received by said read means.

6. The device of claim 1 wherein said read means includes at least one magneto-resistive sensor and wherein said shield means is shaped so that fields induced thereby at said at least one magneto-resistive sensor is generally perpendicular to said at least one magneto-resistive sensor.

7. The device of claim 1 wherein said read means includes a read sensor and said shield means includes two parallel and opposing surfaces on opposite sides of said read sensor, said two parallel and opposing surfaces extending from adjacent to said medium to a predetermined distance from said medium at least about the same extent as said read sensor.

8. The device of claim 1 wherein said read means includes dual magneto-resistive read sensors extending from adjacent to said medium to a predetermined distance from said medium, said shield means including two parallel and opposing surfaces on opposite sides of said read sensors, said parallel surfaces having at least about the same extent as said read sensors.

9. A device comprising:
   read means for modulating a voltage drop imposed on an electrical read current to provide a signal as a function of flux levels stored in a magnetic medium moving relative to said read means, said read means including input means for receiving said read current, said read means including output means for transmitting said signal;
   shield means for isolating said read means from magnetic fields from sources other than a portion of said magnetic medium at a predetermined location relative to said read means, said shield means being positioned with respect to said read means so that said read current induces a magnetic field in said shield means; and write means including a coil inductively coupled to said shield means, said write means including means for writing on said media by driving current through said coil, said write means including cancellation means for driving an offset current through said coil so as to create a magnetic offset field in said shield means which substantially offsets said field in said shield means induced by said read means while said read current is received by said read means.

* * * * *